United States Patent [19]
Henzler et al.

[11] 3,834,213
[45] Sept. 10, 1974

[54] WORKPIECE TRANSLATION MECHANISM FOR TRANSFER DIE PRESS

[75] Inventors: William G. Henzler, Toledo; Norman J. Gressman, Sylvania, both of Ohio

[73] Assignee: Hanzler Mfg. Corp., Toledo, Ohio

[22] Filed: Feb. 12, 1973

[21] Appl. No.: 331,788

[52] U.S. Cl............ 72/405, 72/22, 72/420, 72/421, 113/113 R, 214/1 BB
[51] Int. Cl............................. B21j 11/00
[58] Field of Search ............ 72/405, 421, 420, 448, 72/22, 28; 214/1 BB; 113/113 R

[56] References Cited
UNITED STATES PATENTS

| | | | |
|---|---|---|---|
| 3,011,464 | 12/1961 | Danly et al..................... | 113/113 R |
| 3,057,312 | 10/1962 | Hatch............................. | 113/113 R |
| 3,075,651 | 1/1963 | Kaden............................ | 113/113 R |
| 3,411,636 | 11/1968 | Wallis............................. | 214/1 BB |
| 3,655,070 | 4/1972 | Haydu............................ | 214/1 BB |
| 3,754,667 | 8/1973 | Storch............................ | 214/1 BB |

*Primary Examiner*—Charles W. Lanham
*Assistant Examiner*—James R. Duzan
*Attorney, Agent, or Firm*—W. A. Schaich

[57] ABSTRACT

This invention relates to a workpiece translation mechanism for moving a workpiece through successive stations of a transfer stamping die. The necessary vertical and horizontal movements of the workpiece are accomplished by the cooperation of a plurality of plates which are respectively journalled to each other for reciprocal sliding vertical or horizontal relative motions. Hydraulic cylinders are employed which are operatively connected between the various plates and successively actuated to provide the desired horizontal and vertical motions of a workpiece carrier.

1 Claim, 8 Drawing Figures

WORKPIECE TRANSLATION MECHANISM FOR TRANSFER DIE PRESS

BACKGROUND OF THE INVENTION

Transfer stamping dies have long been utilized in the metal stamping industry. There have been a number of mechanisms heretofore proposed for automatically effecting the movement of a workpiece through the successive stations of a transfer die. It is essential that the workpiece be lifted from the die station in which it has last been worked upon by motion in the same direction, generally vertical, as the motion of the stamping die. It is equally essential that the workpiece be horizontally translated to exactly overlie the next workpiece station, then be moved vertically downwardly into the next station of the transfer die so that the workpiece is accurately deposited in the next die station to receive the proper forming blow from the next reciprocation of the movable die part of the stamping press.

In accordance with this invention, the workpiece translating mechanism comprises a series of cooperating plates, which are respectively slidably journalled on each other to permit the relative reciprocating motion of the uppermost plate in two mutually perpendicular horizontal directions, as well as in a vertical direction. The uppermost plate mounts workpiece engaging fingers. Hydraulic cylinders are respectively operatively connected between the uppermost plate and the three subplates and successively controlled to produce the desired horizontal and vertical reciprocating motions of the workpiece engaging fingers to effect the engagement with the workpiece, the elevation of the workpiece out of the die station, the horizontal translation of the workpiece to the next die station, the lowering of the workpiece into the next die station, the release of the workpiece engaging fingers from the workpiece, and finally, the return of the workpiece engaging fingers to its original or starting position.

Accordingly, it is an object of this invention to provide an improved workpiece translating mechanism for a transfer die.

A particular object of this invention is to provide a workpiece translation mechanism for a transfer stamping operation, wherein all of the required motions of the workpiece in shifting from one work station in the transfer die to the next, are automatically and accurately carried out by a hydraulically controlled mechanism.

Other objects and advantages of this invention will become apparent from the following description, taken in conjunction with the annexed sheets of drawings, on which:

FIG. 1 illustrates the position of the components when the die press is in its stamping position and the workpiece translation mechanism is at its starting position.

AS SHOWN ON THE DRAWINGS

Figure 1:
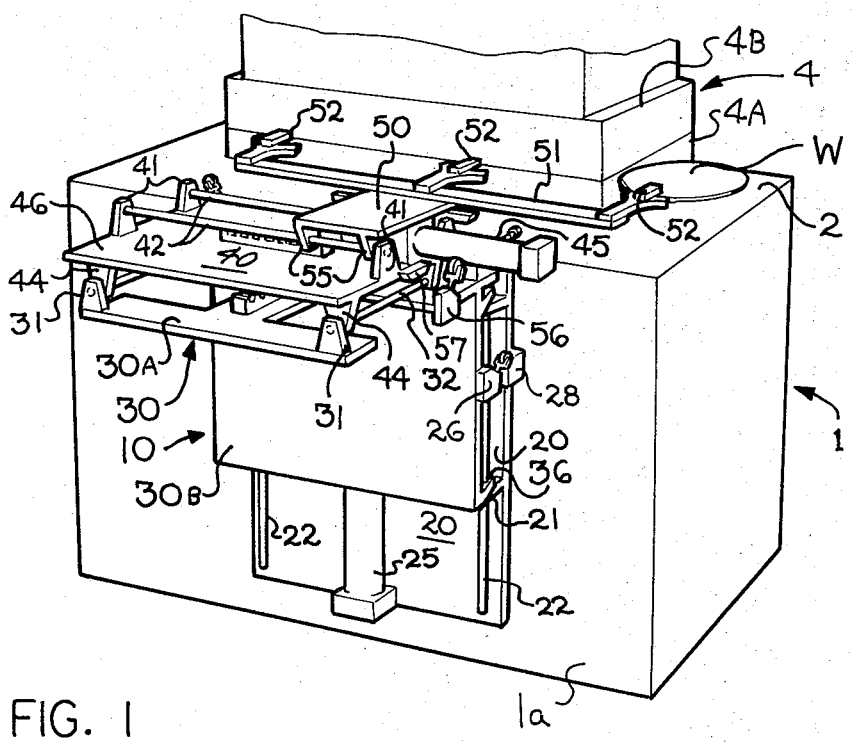
FIG. 1 is a perspective view of a transfer die press having mounted thereon a workpiece translation mechanism embodying this invention.

Referring to FIG. 1, there is schematically shown a conventional stamping press 1 having a bedplate 2 on which is mounted the stationary half 4A of a two-station transfer stamping die 4. The movable half 4B of such stamping die is suitably mounted in the press so as to effect vertical reciprocating motions relative to the stationary die half 4A but the details of the mounting and actuation of the movable die half 4B are not shown, since they are entirely conventional and form no part of this invention.

The workpiece translation mechanism embodying this invention is shown generally by the numeral 10 and comprises a series of at least four plate members 20, 30, 40, and 50, each of which are slidingly reciprocatingly mounted relative to the other so as to permit the top plate 50, which will hereafter be called the workpiece carrier plate, to be moved through a path involving horizontal motions in two mutually perpendicular directions and vertical motions in a manner that will be hereinafter described in detail.

Workpiece carrier plate 50 has mounted along its edge which is closely adjacent to the stamping die 4 a carrier bar 51. At spaced intervals along carrier bar 51 a plurality of workpiece engaging fingers 52 are provided which are of spring metal and shaped so as to engage the edge of workpieces W which are fed to the machine, here shown to be in the form of a flat disc W. Workpiece W is operated on in the first station of the transfer die to form a partially completed workpiece W1 and finished in the second station of the transfer die to form a finished workpiece W2. While this invention will be described and illustrated in connection with a two-station transfer die, it will be obvious that the principles thereof are equally applicable to a multiple station die merely by providing a total number of workpiece engaging fingers 52 equal to one more than the number of stations in the stamping die 4.

Workpiece carrier plate 50 has two sets of depending lugs 55 secured thereto in spaced relationship, and each set of lugs 55 is suitably apertured so as to permit the slidable mounting of the carrier plate 50 upon a pair of horizontal rods 42 which are respectively supported by upstanding brackets 41 formed on the top surface of a first horizontal subplate 40. By virtue of this mounting, the workpiece carrier plate 50 may be horizontally reciprocated relative to the stamping die 4 in the direction parallel to the location of the successive work stations in such stamping die. A hydraulic cylinder 45 is operatively connected between the workpiece carrier plate 50 and the first subplate 40 so as to produce the required horizontal reciprocal movements of the workpiece carrier plate 50 relative to the stamping die 4.

The first subplate 40 is additionally provided with two sets of depending brackets 44 which are suitably apertured so as to permit slidable mounting on a pair of horizontal rods 32 which are respectively mounted in upstanding brackets 31 provided on the top surface of a horizontal plate portion 30A of a second subplate 30. Second subplate 30 is of right angle configuration, having the aforementioned horizontal plate portion 30A integrally connected to a depending vertical plate portion 30B. The horizontal rods 32 are aligned in a direction perpendicular to the alignment of the workpiece stations of the stamping die 4, and thus reciprocal movement of the first subplate 40 along the rods 32 produces a reciprocating horizontal movement of the workpiece carriers 52 into engagement with the workpieces W1 and W2 in the stamping die. A double acting hydraulic cylinder 35 (FIG. 7) is operatively connected between the first subplate 40 and the horizontal portion 30A of the second subplate 30 so as to control the reciprocating movements of the workpiece carriers 52 in the direction normal to the alignment of the workpiece stations in the stamping die 4.

The vertical plate portion 30B of the second subplate 30 is provided with two sets of aligned inwardly projecting brackets 36 which are suitably apertured so as to rigidly mount a pair of vertical rods 22 which are, in turn, respectively slidably mounted in horizontal brackets 21 provided on a third vertical subplate 20. The third subplate 20 is, in turn, suitably secured to the front side 1a of the stamping press 1. A hydraulic cylinder 25 is operatively connected between the vertical plate portion 30B of the second subplate 30 and the third subplate 20 so as to control the vertical reciprocating movement of the second subplate 30 relative to the fixed third subplate 20 and hence control the vertical position of workpiece carriers 52 relative to the stamping die 4.

The operation of the mechanism thus far described may be readily understood by reference to the sequential positions of the mechanism illustrated in FIGS. 1 through 6. In FIG. 1, the movable half 4B of the stamping die 4 is in its lowered forming position and, of course, the workpiece engaging fingers 52 are in their normal starting position outside of the stamping die 4. In this position, the right hand end set of fingers 52 are disposed beyond the lateral confines of the stamping die 4 and a workpiece blank W may be manually inserted in this end set of workpiece engaging fingers 52.

Figure 2:
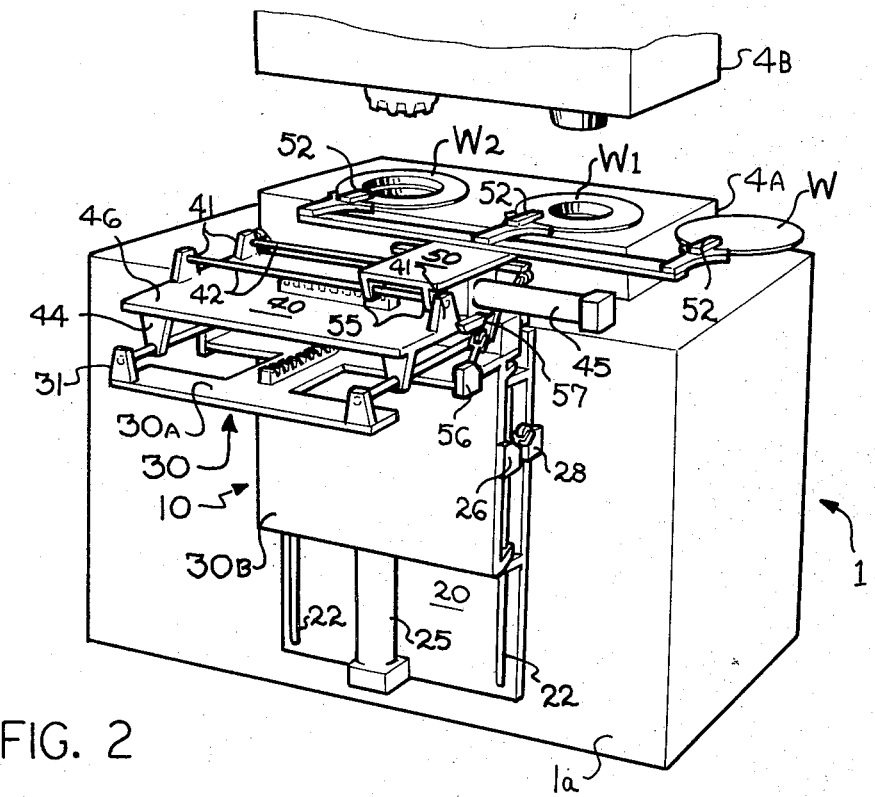
FIG. 2 is a view similar to FIG. 1 but illustrating the position of the components when the movable half of the stamping die is elevated and the workpiece translation mechanism is moved to its second position, in which carrier fingers engage the workpieces in the stations of the stamping die.

In FIG. 2, the movable half 4B of stamping die 4 has been elevated and the hydraulic cylinder 35 has been actuated to move the first subplate 40 inwardly so as to bring the workpiece engaging fingers 52 into engagement with the periphery of the workpieces W1 and W2 located in the first and second stations of the stamping die 4A.

Figure 3:
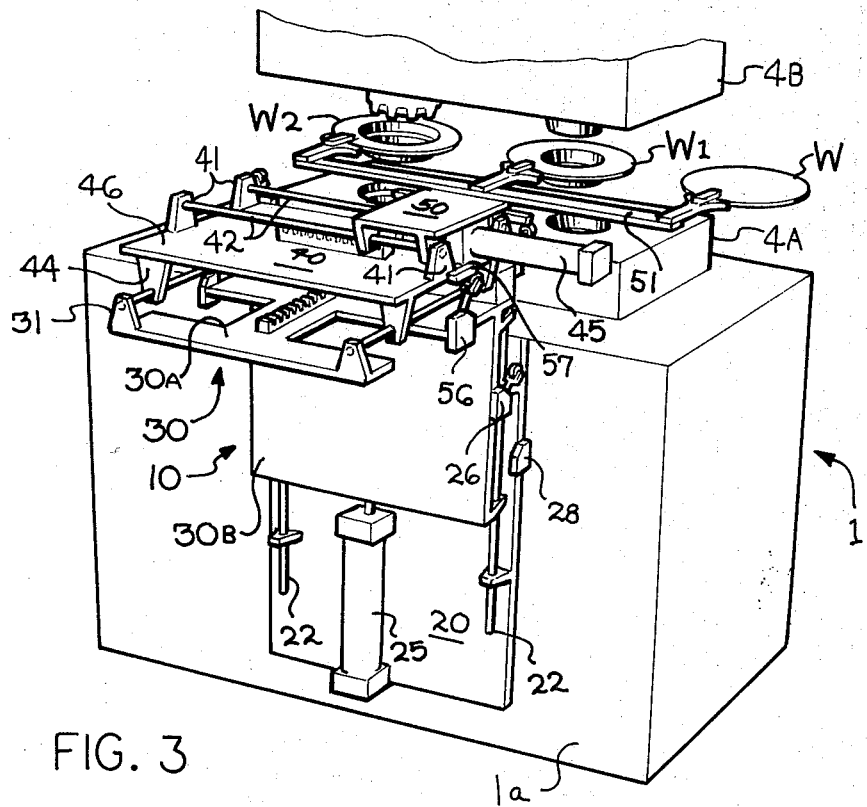
FIG. 3 is a view similar to FIG. 2 but illustrating the position of the components when the workpiece translation mechanism is actuated to elevate the workpieces out of the stationary half of the stamping die.

The next sequence is illustrated in FIG. 3, wherein the vertical hydraulic cylinder 25 has been actuated to raise the second subplate 30 vertically relative to the third subplate 20 and thus lift the workpieces W1 and W2 out of the stamping recesses in the stationary half 4A of the stamping die.

Figure 4:
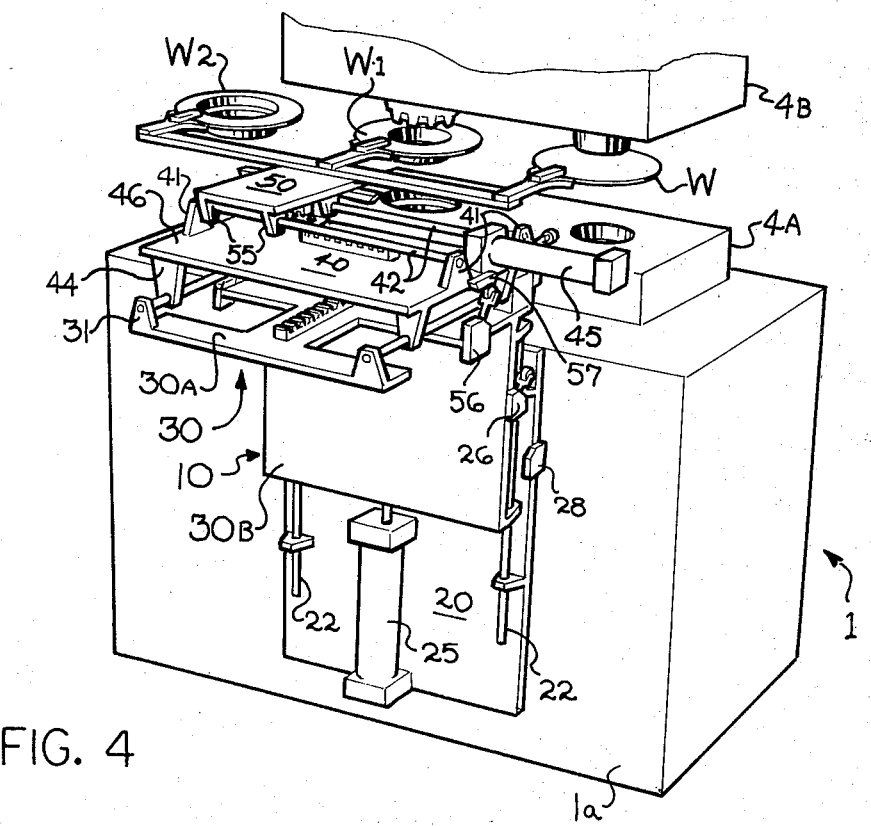
FIG. 4 is a view similar to FIG. 3 but illustrating the next position of the components of the workpiece translation mechanism wherein the workpieces are moved horizontally to overlie the next station of the transfer die.

In the next operation, illustrated in FIG. 4, the hydraulic cylinder 45 has been actuated to shift the workpiece carrier plate 50 horizontally in the same direction as the alignment of the stations of the stamping die 4 and thus move the finished workpiece W2 completely out of the stamping die and move the partially finished stamping die W1 from the first station to a position overlying the second station of the stamping die and concurrently move the workpiece blank W into overlying position with respect to the first station of the stamping die.

Figure 5:
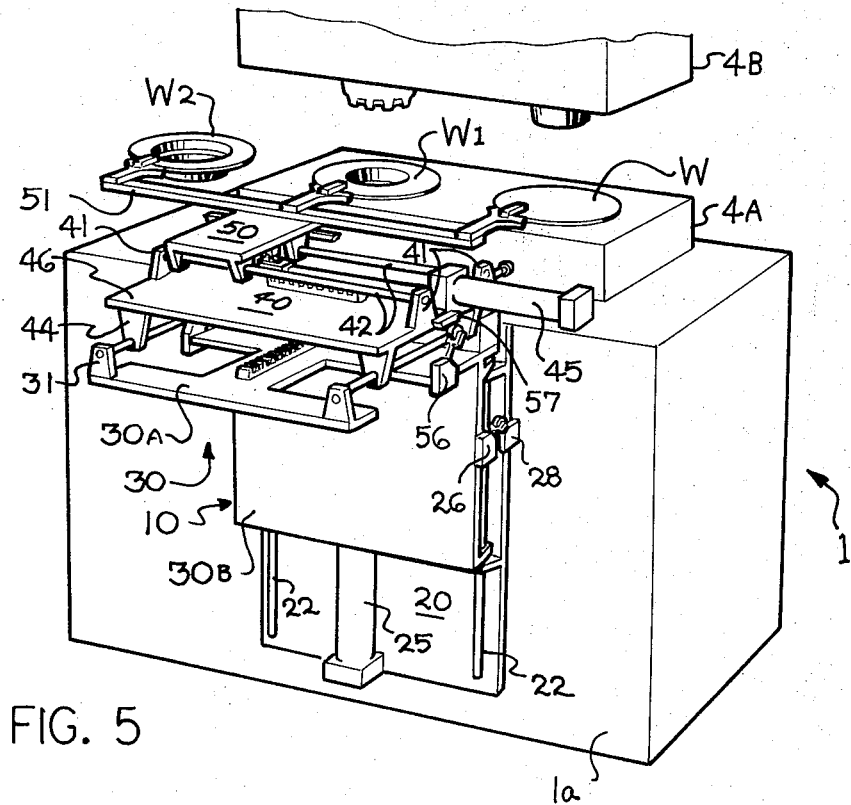
FIG. 5 is a view similar to FIG. 4 but illustrating the next position of the workpiece translation mechanism wherein the workpieces are lowered into the next station of the stamping die.

In the next position, illustrated in FIG. 5, the vertical hydraulic cylinder 25 has been actuated in the reverse direction to effect a lowering of the workpieces W and W1 respectively into the first and second stations of the stationary half of the stamping die 4A.

Figure 6:
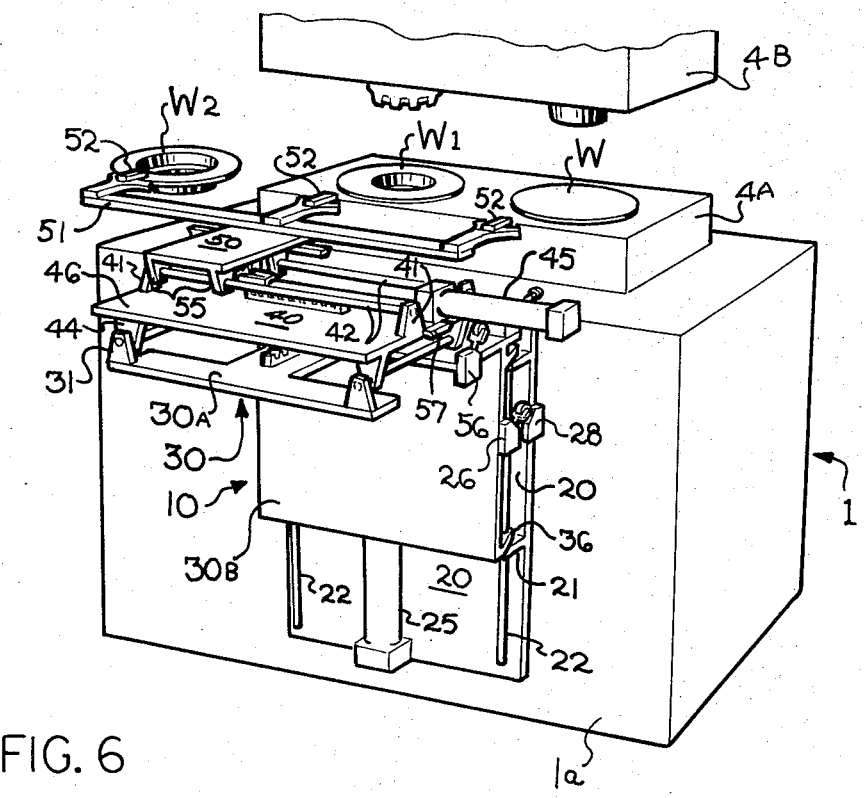
FIG. 6 is a view similar to FIG. 5 but illustrating the final position of the workpiece translating mechanism wherein the workpieces are released and the workpiece carriers withdrawn from the path of the stamping die, preliminary to the stamping die making its next stroke.

In the final motion, illustrated in FIG. 6, the hydraulic cylinder 35 has been actuated to horizontally retract the workpiece engaging fingers 52 from the workpieces W and W1 and hence clear the way for the next stamping stroke of the movable half 4A of the stamping die 4. The finished workpiece W2 can now be removed.

The last movement of the workpiece translation mechanism involves the reverse actuation of the hydraulic cylinder 45 to horizontally return the workpiece carrier plate 50 to its starting position illustrated in FIG. 1.

While each of the aforedescribed actuations of the hydraulic cylinders could be manually controlled, this invention preferably incorporates an automatic control arrangement for successively actuating the various hydraulic cylinders to effect the aforedescribed movements of the workpiece engaging fingers 52. Since the hydraulic control circuits interconnecting all of the cylinders 25, 35, and 45 is entirely conventional, it will not be illustrated in detail but the successive actuation of such cylinders is controlled by a plurality of limit switches, as hereinafter described. The initial actuation of the hydraulic cylinder 45 is controlled by a limit switch (not shown) which is actuated by the upward motion of the movable half 4A of the stamping die 4. The resulting inward motion of the workpiece engaging fingers 52 is detected by a cam block 57 engaging limit switch 56 (FIG. 7), and this causes through conventional hydraulic control circuits the deactuation of the cylinder 35 and initiates the actuation of the vertical cylinder 25 to produce the vertically upward motion illustrated in FIG. 3. This upward motion continues until a limit switch 26 is actuated by contact with a cam block 27 (FIG. 8), and this switch effects the deactuation of the cylinder 25 and initiates the flow of pressurized fluid to the cylinder 45, causing it to move thw workpiece carrier plate 50 laterally to effect the change in position of the workpieces from the position shown in FIG. 3 to that shown in FIG. 4. This motion continues until the limit switch 66 is engaged by a stationary cam block 67, whereupon the supply of pressurized hydraulic fluid in cylinder 35 is interrupted. At this point, the workpiece engaging translation mechanism is in the position illustrated in FIG. 4. The actuation of limit switch 66 causes the energization of cylinder 25 in a vertically downward direction and thus effects a lowering of the workpiece carrying mechanism to the position shown in FIG. 5. This downward motion is interrupted by the engagement of limit switch 26 with a stationary cam block 28. At this point, the supply of hydraulic fluid is cut off from the vertical cylinder 25 and is directed to the cylinder 35 to effect the actuation of that cylinder in a reverse direction to retract the workpiece engaging elements 52 horizontally out of the path of the movable die half 4A and thus achieving the position illustrated in FIG. 6. This motion is detected by a limit switch 59 engaging a stationary cam block 60. Lastly, the actuation of limit switch 59 effects the reverse actuation of horizontal cylinder 45 to return the workpiece engaging fingers 52 to their starting position illustrated in FIG. 1. Completion of this motion is detected by a limit switch 69 being engaged by a stationary cam block 68.

Accordingly, it is apparent that the successive motions of the workpiece carrying fingers to effect the translation of the workpieces into the transfer die and from one station of the transfer die to the next station can be automatically controlled.

Figures 7, 8:
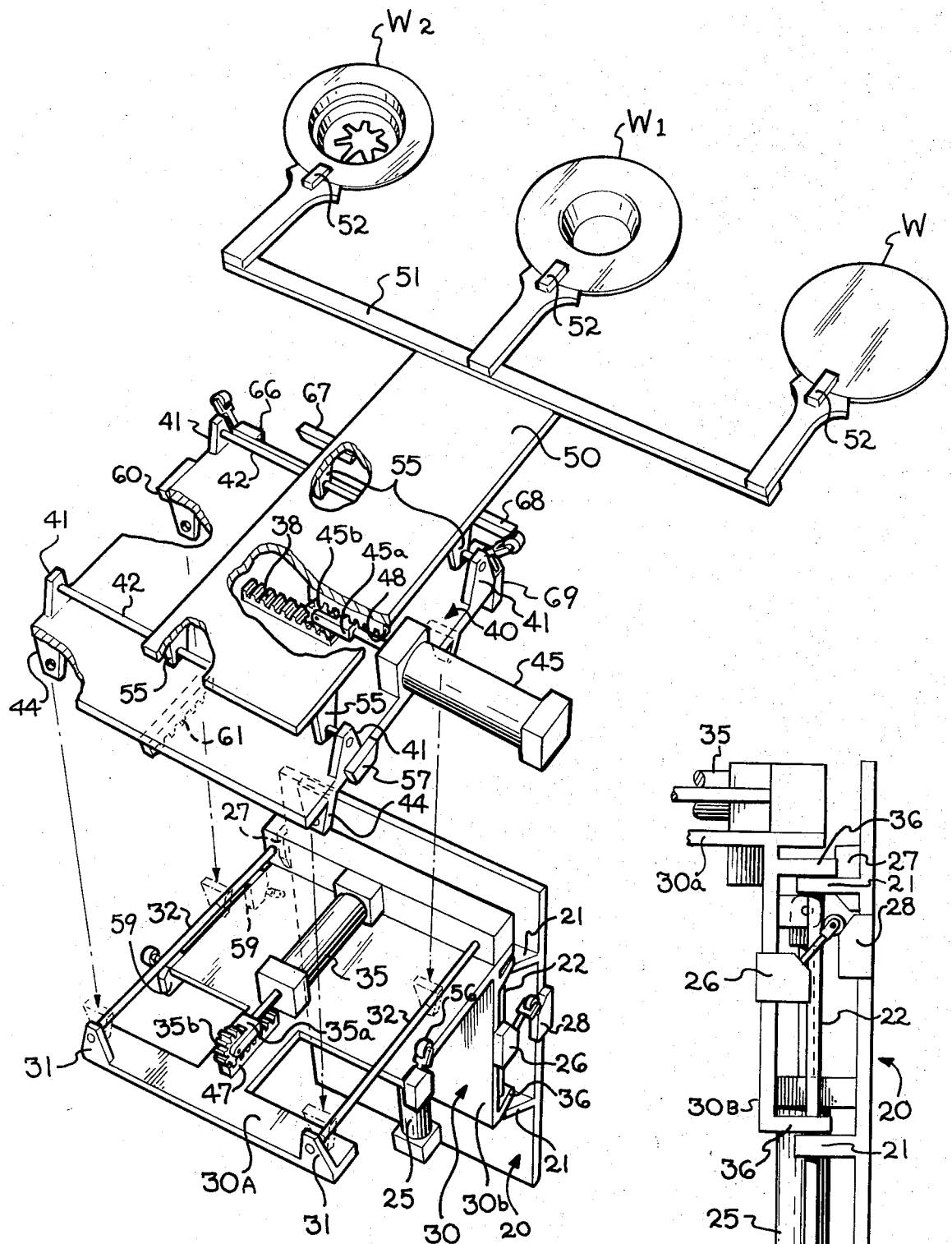
FIG. 7 is an enlarged scale perspective exploded view, partly broken out for clarity of illustration, of the workpiece translation mechanism.
FIG. 8 is an enlarged scale side view of a portion of the workpiece translation mechanism shown in FIG. 1.

In the event that the required horizontal motions are somewhat large in extent, which would require very long hydraulic cylinders, it may be desirable to utilize a motion amplifying mechanism which is best shown in FIG. 7. Such mechanisms are shown as applied to the horizontal cylinders 35 and 45 and comprise a bifurcated bracket 35a and 45a respectively secured to the ends of rods of cylinders 35 and 45 and which respectively journal spur gears 35b and 45b. Spur gear 35b operates between a horizontal rack 61 secured to the underside of the carrier plate 50 and a similar horizontal rack 47 secured to the top side of the first subplate 40. Similarly, gear 45b operates between a rack 48 secured to the underside of the first subplate 40 and a corresponding horizontal rack 38 secured to the top side of the horizontal plate portion 30A of the second subplate 30. By this well-known mechanical connection, the effective motion imparted to the relatively movable components is twice the stroke of the piston of the actuating cylinder.

As will be evident to those skilled in the art, modifications of this invention can be made in the light of the foregoing disclosure without departing from the scope of the appended claims.

I claim:

1. Apparatus for translating a workpiece from one successive work station to another in a transfer die press comprising:
    1. A workpiece carrier plate having means on one end thereof for holding a workpiece;
    2. A first subplate having means thereon for slidably mounting said carrier plate for horizontal reciprocal movement parallel to the location of the work stations;
    3. A first cylinder carried by said first subplate and operatively connected (between said carrier plate and said first subplate) to reciprocate said carrier plate relative to said first subplate;
    4. A second subplate having a horizontal plate portion and a depending vertical plate portion, and means on said horizontal portion for slidably mounting said first subplate for horizontal reciprocal movement perpendicular to the location of the work stations;
    5. A second cylinder means operatively connected between said first and second subplates to reciprocate said first subplate relative to said second subplate;
    6. A third subplate adapted for mounting on the side of said press in a vertical position, and means on said third subplate for slidably mounting the said vertical plate portion of the second subplate for vertical reciprocal movements relative to said third subplate; and
    7. A third cylinder means operatively connected between said second subplate and said third subplate to reciprocate said second subplate vertically relative to the die press.

* * * * *